(No Model.)
W. A. WILCOX.
FUEL FEEDING PIPE.
No. 400,280. Patented Mar. 26, 1889.
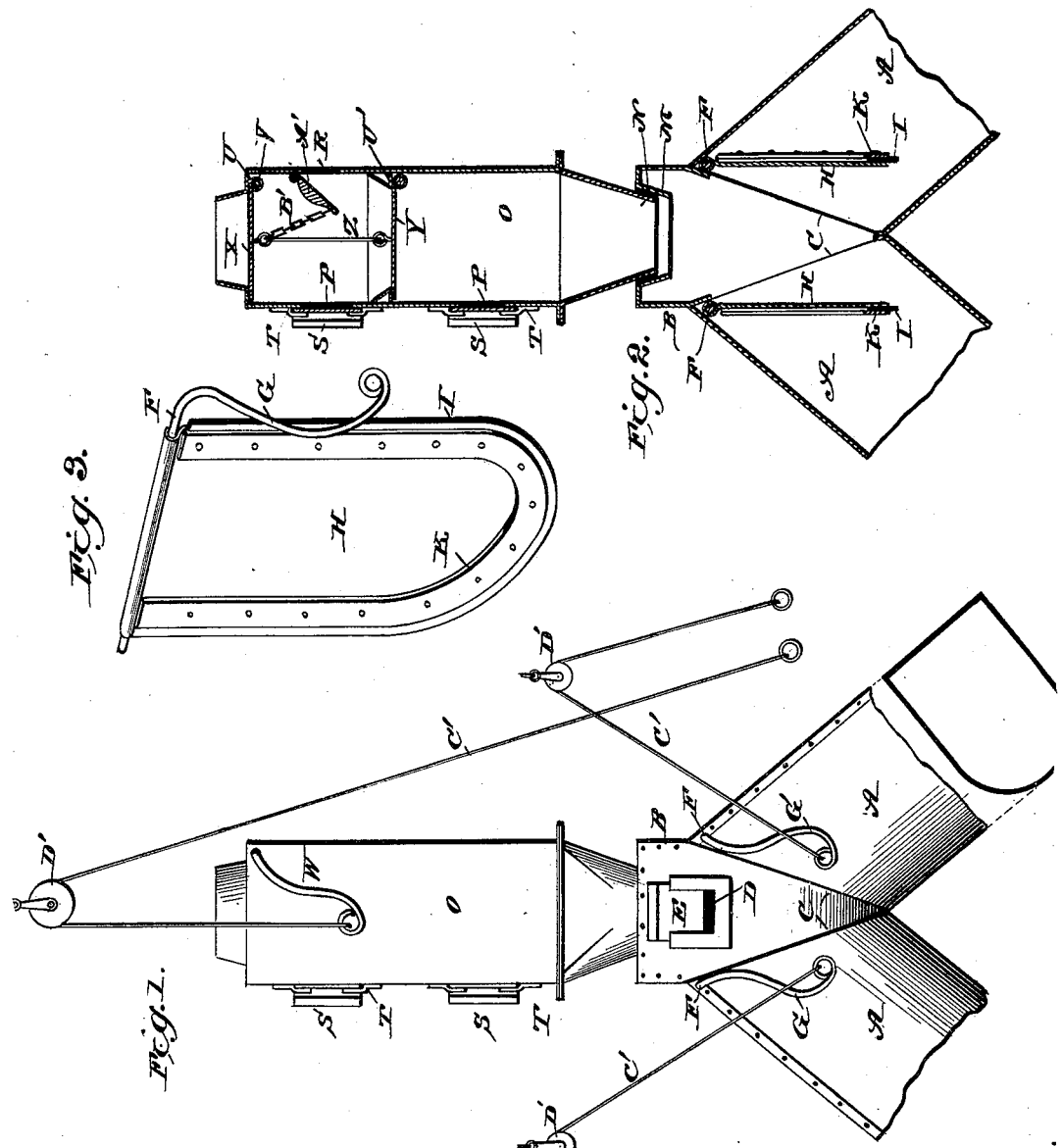
Witnesses
Inventor
William A. Wilcox
By his Attorneys

UNITED STATES PATENT OFFICE.

W. ALARIC WILCOX, OF GRAND RAPIDS, MICHIGAN, ASSIGNOR TO FOSTER STEVENS & CO., OF SAME PLACE.

FUEL-FEEDING PIPE.

SPECIFICATION forming part of Letters Patent No. 400,280, dated March 26, 1889.

Application filed April 24, 1888. Serial No. 271,721. (No model.)

*To all whom it may concern:*

Be it known that I, WILLIAM ALARIC WILCOX, a citizen of the United States, residing at Grand Rapids, in the county of Kent and State of Michigan, have invented new and useful Improvements in Fuel-Feeding Pipes, of which the following is a specification.

My invention relates to fuel-feeding pipes and gates for conveying shavings from workshops to boiler-furnaces or other receptacles to be consumed as fuel; and it consists in the peculiar construction and combination of devices, that will be more fully set forth hereinafter, and particularly pointed out in the claims.

In the drawings, Figure 1 is an elevation of an apparatus embodying my improvement. Fig. 2 is a vertical sectional view of the same. Fig. 3 is a detail view.

A represents a pair of oppositely-inclined fuel-feeding pipes, which are united at their upper ends by a box, B. The inner or lower sides of the feed-pipes are semi-cylindrical in shape, and the outer sides thereof are square, as shown, and at the junction of the upper end of said pipes with the box B are formed offsets or shoulders C. The box B has an opening, D, provided with a slide or valve, E, by means of which said opening may be uncovered. In the upper ends of the pipes, at their junction with the box, are journaled transverse rock-shafts F, which are provided with crank-arms G at their outer ends.

H represent a pair of cut-off valves, which are arranged in the upper ends of the pipes A, correspond in shape with the cross-section of the said pipes, and are rigidly secured to the rock-shafts F, so that said valves may be opened or closed by partly rotating the rock-shafts, as will be readily understood. Said valves are adapted to close against the shoulders or offsets C, and thereby cut off communication between the pipes, and are adapted to open against the outer or upper plane sides of the pipes A, so as to open communication between said pipes. On the outer side of each valve, at the edge thereof, is a strip, I, of rubber or other suitable material, which projects beyond the edges of the valves, and is adapted to effect a tight joint in the sides of the pipe when the valve is closed. Said rubber or packing strip is secured in position by a similar strip or strap, K, of metal, which is bolted or riveted to the outer side of the valve, the rubber or packing strip being secured between the valve and said metallic strap.

The shape of the pipes in cross-section at their point of connection, as above described, is useful, because it permits the valves H to lie back closely against the upper sides of the pipe, so as to present no obstruction to the blast. That shape, however, is not essential. The upper end of the box B is closed and has a central circular opening provided with a downwardly-extending conical or tapered flange, M. In the said opening is secured a packing-ring, N, of rubber or other suitable material.

O represents a vertical rectangular box, which forms a portion of the pipe (not shown) with which the fan or blower communicates, and said box has its lower end made conical or tapered and adapted to fit in the opening M and effect a tight joint with the box B. Said box O is rectangular in transverse section, is provided on one side with a pair of openings, P, which are arranged one above the other, and is provided on the opposite side with an opening, R. The openings P may be opened or closed by means of slides S, which are guided in suitable ways, T, on the box. An offset, U, is formed at the upper end of the box, and a similar offset, U', is formed in the box at a suitable distance above the lower opening, P.

V represents a rock-shaft, which is journaled transversely in the rear side of the box at the upper end thereof, and has a crank-arm, W, at one end. To the said rock-shaft is rigidly secured one side of a valve, X, which valve is adapted to close against the upper side of the box, so as to cut off communication between the same and the pipe (not shown) which leads therefrom. At a suitable distance below the valve X is a similar valve, Y, which is adapted to close against the lower offset, U', and is connected to the upper valve, X, by means of a link or chain, Z, so that the said valve Y will be automatically operated by the valve X.

A' represents a valve which is hinged or pivoted to the rear side of the box at a slight distance above the opening R, and adapted to close against the rear side of the box, so as to cover the said opening. The said valve is connected to the upper valve, X, by means of a chain or flexible link, B', so that when the valves X and Y are closed the valve A' is automatically opened and admits fresh air into that portion of the box which is between the valves, so as to interpose an air space or chamber between the lower portion of the box, which communicates with the furnaces and the pipes A, and the upper portion of the box or pipes, through which the shavings or sawdust is fed, thus preventing the possibility of fire traveling through the said box and igniting the shavings therein when the apparatus is not at work, and thereby avoiding danger of conflagration from this source.

Although I have described the box O as forming part of the pipe leading into the box B, I would have it understood that I do not limit myself to that arrangement, as it is obvious that it may be situated in any convenient or desired portion of the furnace-feeding pipe, or be located in any suitable or convenient position near the boilers or elsewhere, so as to be readily accessible to the operator, and also so that the cold-air chamber may act to prevent the heat from working back through the pipe, thereby injuring the same. In such case the double gate above described is of further special utility, because where a single shut-off gate is used it is liable to become heated from its proximity to the fire, and the shavings and dust which are liable to accumulate upon it when it is closed may thus become ignited. The possibility of such a result is prevented by the double gate and intermediate air-chambers. It is also obvious that the valves H in the pipes A, instead of being hinged at their upper edges, as shown, may be applied in any other suitable manner.

The valves in the pipes A and the valves in the box O are provided with suitable cords, C', which pass over guiding-sheaves D', and are adapted to be used for operating the valves.

By reason of the openings D and P and the slide for closing the said openings access may be attained to the interiors of the boxes B and O, and thereby enable obstructions which may be drawn into the said boxes by the fan or blower to be removed.

I propose in practice to construct my pipes A, boxes C O, and valves of heavy sheet metal. By reason of the pipes A being semi-cylindrical on their lower or inner sides said pipes offer less friction to the dust and shavings which pass through the same.

Having thus described my invention, I claim—

1. The combination of the inclined pipes A, having the shoulders or offsets C at their upper ends, and the valves H, hinged or pivoted in the said pipes and adapted to close against the said shoulders or offsets, substantially as described.

2. The combination of the inclined pipes A, having the shoulders or offsets C at their upper ends, and the valves hinged or pivoted in the said pipes and provided with the packings I, of rubber or suitable material, projecting beyond the edges of the valves and adapted to effect tight joints with the pipes, substantially as described.

3. The combination of the inclined pipes A, the box B, connecting the upper ends of said pipes and forming the shoulders or offsets C, and the valves H, hinged or pivoted in the upper ends of the pipes and adapted to close against said shoulders or offsets, substantially as described.

4. The combination of the box B, having the opening D and the slide or cover for said opening, the pipes A, having their upper ends connected to and communicating with the box, and the valves H, hinged or pivoted in the pipes, adapted to open and close the same and provided with the operating crank-handles G, substantially as described.

5. The double safety-gate for fuel-feeding pipes, having two doors with an air-space between them, said two doors connected and operated simultaneously by one movement in opening and closing, substantially as described.

6. In combination with a double safety-gate for fuel-feeding pipes, such gate consisting of two doors connected together and simultaneously operated by one movement and with an air-space between, a slide or door in the pipe between the two parts of the gate, whereby such intervening air-space can be exposed to the outer air, substantially as described.

7. The combination, with the box O, of the valves X Y, hinged or pivoted therein and arranged one above the other, and the link arranged within the box O and connecting the said valves, whereby they may be closed simultaneously and caused to form an air-space in the box between them, substantially as described.

8. The combination of the box O, having the opening on one side, the valves X Y, hinged in the said box, one of said valves having the arm W, whereby it may be operated, and the link connecting the said valves, substantially as described.

9. The combination of the box O, having the opening R on one side, the valves X Y, hinged in the said box at a distance apart, for the purpose set forth, the valve A', hinged to one side of the box above the opening R, and the link connecting said valve to the valve X, substantially as described.

10. In fuel-feeding pipes for furnaces, the two inclined pipes forming branches of the main pipe, each of said inclined pipes having at or near the point of bifurcation an independent valve or gate adapted to close that pipe and direct the entire current of air through the other, said gates also adapted to
5 be both opened at the same time entirely out of the passage-way, substantially as described.

In testimony that I claim the foregoing as my own I have hereto affixed my signature in presence of two witnesses.

W. ALARIC WILCOX.

Witnesses:
ADAM MUTZ,
THOMAS STINE.